Patented July 3, 1928.

1,675,664

UNITED STATES PATENT OFFICE.

WILHELM REUSS, OF MANNHEIM, GERMANY.

WELDING MEDIUM FOR ALUMINUM.

No Drawing. Application filed December 3, 1927, Serial No. 237,582, and in Germany July 24, 1925.

Soldering or welding means have already been proposed which contain borax and boracic acid as their chief ingredients, and the mixing of either borax ($Na_2B_4O_7$) and boracic acid anhydride ($B_2O_3$) in equal parts, or mixtures of alkali salts (borax or soda) is already known, the boracic acid being in such proportions that, to one molecule of sodium oxide about three to four molecules of boracic acid anhydride. are added. The soldering, welding or flux media thus compounded, which only differ from each other in their percentage of boracic acid, have, owing to this acid percentage, an acid reaction. If they be allowed to react upon pure aluminum, they do not attack the metal, even after long continued action. These means are not able to remove the superficial oxide coating of the metal, so that when soldering or welding therewith a turgid metallic flux is obtained with the simultaneous formation of small particles of oxides. Consequently the surface of the welded or soldered seams are dirty, rough and uneven to the touch.

Now the present invention has reference to a medium specially suitable for soldering or welding aluminum, which is a flux, which, in use, produces a clean smooth surface. This effect is realized due to the fact that a medium containing boracic acid, preferably the beforementioned mixture of borax and boracic acid, has added to it an excess of free alkali, such as caustic potash for example.

The welding or soldering medium preferably contains three substances in equal parts, so that it consists of one third borax, boracic acid and caustic potash respectively.

Whereas the borax and boracic acid containing media, hitherto known, had first of all to be melted in their water of crystallization, the new soldering or welding medium can be used either in the dry state or in aqueous solution.

Due to this improved medium, welding, or soldering is materially facilitated and the process is considerably cheapened.

With the new medium other metals, such as copper, tin, zinc, etc., can also be welded or soldered to aluminum or welded together in a perfectly satisfactory manner.

What I claim and desire to secure by Letters Patent of the United States is:—

1. A soldering or welding medium consisting of a mixture of equal parts of borax, boracic acid and caustic potash.

2. A soldering or welding medium consisting of an aqueous solution of equal parts of borax, boracic acid and caustic potash.

WILHELM REUSS.